United States Patent [19]
Cleasby

[11] Patent Number: 5,385,171
[45] Date of Patent: Jan. 31, 1995

[54] TWO-STAGE HYDRAULIC VALVES

[75] Inventor: Kenneth G. Cleasby, Chichester, England

[73] Assignee: Trinova Limited, Sussex, England

[21] Appl. No.: 71,522

[22] Filed: Jun. 3, 1993

[30] Foreign Application Priority Data

Jun. 5, 1992 [GB] United Kingdom ............... 9211898

[51] Int. Cl.⁶ ........................................... F15B 13/043
[52] U.S. Cl. ...................... 137/625.64; 137/596.17
[58] Field of Search ...................... 137/596.17, 625.64

[56] References Cited

U.S. PATENT DOCUMENTS

| | | | |
|---|---|---|---|
| 4,617,967 | 10/1986 | Read et al. ................. | 137/596.17 X |
| 4,643,225 | 2/1987 | Imhof ....................... | 137/596.17 |
| 4,860,792 | 8/1989 | Ichihashi et al. ............. | 137/596.17 |

*Primary Examiner*—Gerald A. Michalsky
*Attorney, Agent, or Firm*—Barnes, Kisselle, Raisch, Choate, Whittemore & Hulbert

[57] ABSTRACT

An electrically operated, two-stage hydraulic spool valve comprising a maid stage (2) having a main spool (4), centering springs (9) acting on the main spool, a pilot stage (1) having a pilot spool (12), and two solenoids (39) acting on respective ends of the pilot spool to control the operating position of the latter the solenoid being opposed by return springs (18) also acting on respective ends of the pilot spool, the pilot stage comprising tank port means (23,24), supply port means (26), and two service ports (27,28), and the pilot spool comprising two portions (13,14), a spring (15) interposed between the two portions and operable to urge the two portions apart in a direction axially of the pilot spool so that on de-energization of the solenoids, the portions of the pilot spool separate under the action of the spring to provide an interconnection between the pilot service ports and the tank port means. The tank port means comprise two tank ports (23,24) between which the two service ports (27,28) are disposed, and the supply port means (26) comprises two supply ports (26a,26b) disposed between the service ports (27,28) and spaced apart by an amount such that, in normal operation of the pilot valve, neither supply port sees the ends of the two portions of the pilot spool which are maintained in contact by the operation of the solenoids (39).

6 Claims, 2 Drawing Sheets

TWO-STAGE HYDRAULIC VALVES

BACKGROUND OF THE INVENTION

1. Field of the Invention

The present invention relates to two-stage proportional directional control spool valves.

2. Description of the Prior Art

Solenoid-operated proportional control valves are known having a spool acted upon by a solenoid at each end and provided with centring springs. Should the electrical supply to the solenoids fail, the spool is brought to this central or null position by the centring springs, in which position the service ports of the valve are sealed so that the load is hydraulically locked in position. A single-stage valve is thus fail-safe in the event of electrical failure.

In another known arrangement, the pilot spool is acted upon by a single solenoid at one end with a return spring acting on the opposite end of the spool. With this arrangement, in the event of electrical failure to the solenoid, the return spring moves the spool to an offset, fail-safe position and thus, as with the two-solenoid arrangement, a positive fail-safe position of the pilot spool is achieved. The disadvantage of this arrangement is that as the pilot moves to the offset, fail-safe position, it may pass through the normal operating range of the pilot spool and thus transmit a short pulse of supply pressure fluid to one of the service ports which in turn causes the main valve to make a small movement away from null and thus move a load controlled thereby. This can give rise to difficulties in some applications.

The use of two solenoids thus offers an advantage over the use of a single solenoid because the pilot spool is centred as opposed to being offset, when there is an electrical failure. However, the use of two solenoids alone would not overcome the problem because the spool is ideally constructed so as to have as close as possible zero lap during normal operation and this does not give rise to a rapid or reliable fail-safe condition. Zero lap is required so as to be able to effect quick reversal of the main stage when required. Both underlap end overlap would introduce some delay in this regard which, however small, is undesirable in the context of precise control of the main stage. However, upon failure of the solenoids, the main stage needs to be centred quickly by equalising the pressure in the end chambers of the main spool and to achieve this, the pilot spool is ideally underlapped, whereby there is a conflict of requirements between normal operation and fail-safe operation.

In U.S. Pat. No. 4,617,967 there is disclosed a two-stage proportional control valve in which the pilot spool is split into two parts with a spring arranged to act between the two parts so as to urge them apart although in normal operation of the valve, the two parts of the pilot spool are maintained in contact with each other due to the forces exerted by the solenoids. When the solenoids are de-energised, intentionally or as a result of electrical failure, the spring moves the two parts of the spool away from each other, thereby changing the lap conditions and giving a well-defined fail-safe condition. However, the control valve disclosed in U.S. Pat. No. 4,617,967 has an arrangement of ports in the pilot valve to accommodate the split-spool arrangement, the port arrangements being in fact the reverse of the normal arrangement, whereby the usual single supply port is made the tank port and the usual two tank ports made the supply ports, these being linked by a gallery or loop. The tank loop in a valve normally has a low pressure rating so that if subjected to supply pressure, can give rise to valve body distortion unless, of course, the valve body is strengthened with the attendant disadvantage of increased manufacturing costs. If the normal, central pressure supply port is used with a split-spool arrangement, as disclosed in U.S. Pat. No. 4,617,967, a changeover block would have to be employed, again with increased manufacturing costs.

SUMMARY OF THE INVENTION

According to the present invention there is provided an electrically operated, two-stage hydraulic spool valve comprising a main stage having a main spool, centring springs acting on the main spool, a pilot stage having a pilot spool, and two solenoids acting on respective ends of the pilot spool to control the operating position of the latter, the solenoids being opposed by return springs also acting on respective ends of the pilot spool, the pilot stage comprising tank port means, supply port means, and two service ports, and the pilot spool comprising two portions, a spring interposed between the two portions and operable to urge the two portions apart in a direction axially of the pilot spool so that on de-energisation of the solenoids, the portions of the pilot spool separate under the action of the spring to provide an interconnection between the pilot service ports and the tank port means, characterised in that the tank port means comprise two tank ports between which the two service ports are disposed, and in that the supply port means comprises two supply ports disposed between the service ports and spaced apart by an amount such that, at least in normal operation of the pilot valve, neither supply port sees the ends of the two portions of the pilot spool which are maintained in contact by the operation of the solenoids.

Preferably, the two supply ports are formed from a single supply port by the provision of a sleeve within which the pilot spool is slidably mounted, the sleeve being formed with at least two spaced-apart apertures disposed so as to be in communication with the supply port and so as to divide the latter into two, the apertures being spaced apart by an amount such that in normal operation of the pilot valve neither supply port sees the ends of the two parts of the pilot spool which are maintained contact by the solenoids. With this arrangement, a standard pilot valve casing can be provided with the conventional single pressure supply port.

Preferably, neither supply port sees the ends of the parts of the pilot spool in any mode of operation of the valve.

BRIEF DESCRIPTION OF THE DRAWINGS

A two-stage proportional control valve constructed in accordance with the present invention will new be described in greater detail, by way of example, with reference to the accompanying drawings in which.

DESCRIPTION OF THE ILLUSTRATED EMBODIMENT

Figure 1:
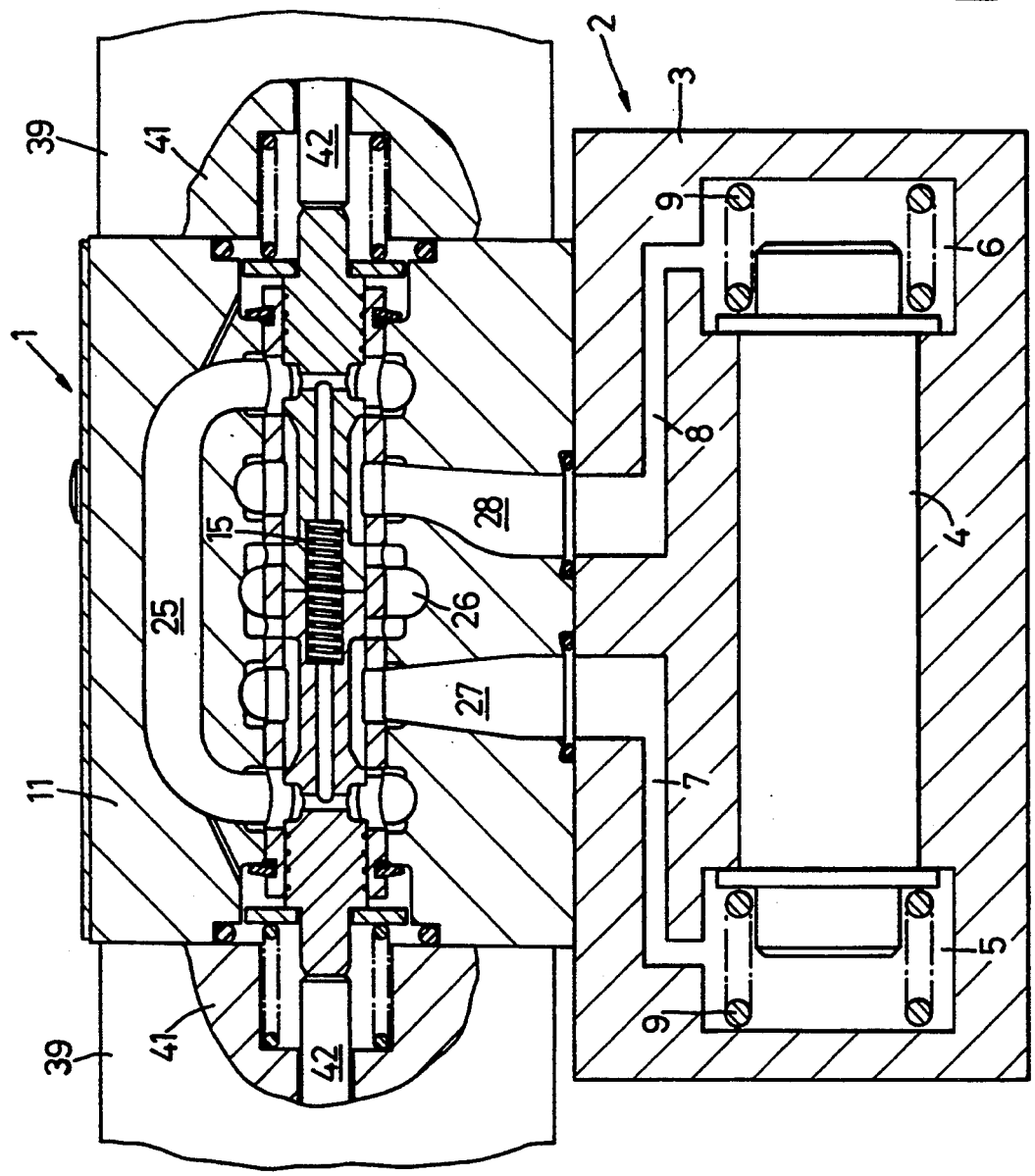
FIG. 1 is a partly diagrammatic representation of the embodiment.

Referring to the drawings, the two-stage proportional control valve comprises a pilot stage or valve 1 and a main stage or valve 2. The main stage 2 (shown diagrammatically) comprises a body 3 in which is slidably mounted a spool 4 of overlapped construction, the body comprising two end chambers 5 and 6 to which pressure fluid can be applied through respective channels or drillings 7 and 8 from the pilot valve 1. Two centring springs 9 act on respective ends of the spool 4 in conventional manner.

Figure 2:
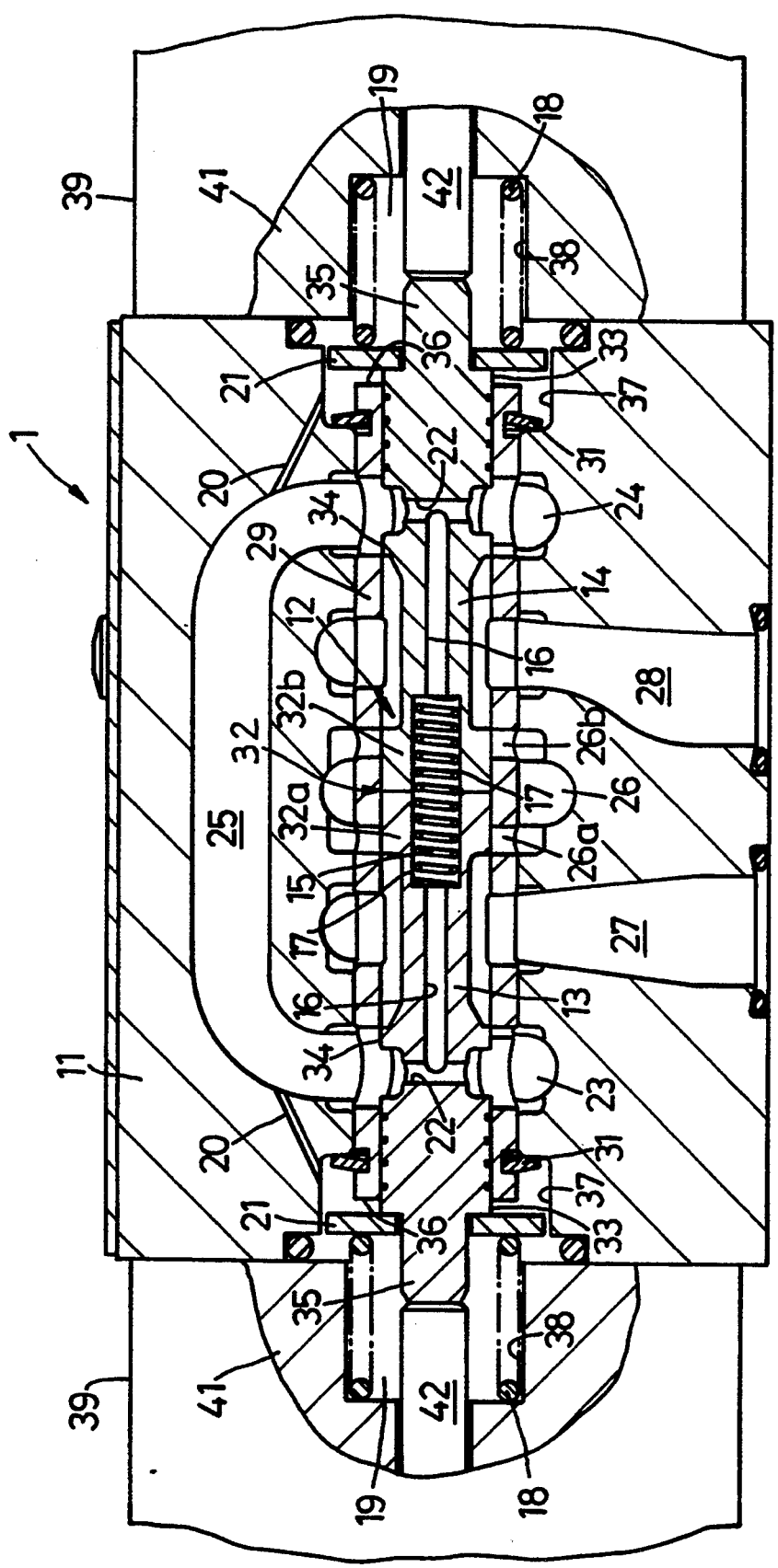
FIG. 2 is an enlarged view of the pilot valve of the embodiment in FIG. 1.

Turning now more specifically to FIG. 2 of the drawings, the pilot valve 1 is of zero lapped construction and comprises a body 11 in which is slidably mounted a spool 12 formed from two separable portions 13,14 urged apart by a spring 15. Each portion 13,14 of the pilot spool 12 has a through bore 16 and a counter bore 17 at the adjacent ends of the two portions, in which counter bores the respective ends of the spring 15 are accommodated. The outer end of each spool portion 13,14 is acted upon by a centring or return spring 18, the rate and preload of the spring 15 being sufficient to overcome the action of the centring springs 18. The centring springs 18 are accommodated in respective end chambers 19 and act between one end of the chamber and washer 21. The outer end of each through bore 16 connects with a radial bore 22 which in all positions of the pilot spool is in communication with the corresponding tank port 23,24, the tank ports being interconnected by a gallery or loop 25. Drillings 20 in the body 11 connect the end chambers 19 to tank.

A central pressure or supply port 26 is provided on each side of which is provided a service port 27 and 28 which themselves are disposed between the tank port 23 and 24. The pressure port 26 is in fact divided into two ports 26a and 26b by a sleeve 29 which is inserted into the bore of the pilot body 11 and retained in position by spring washers 31. It will be seen that the sleeve 29 has apertures in alignment with the tank ports 23 and 24 and the service port 27 and 28.

The pilot spool 12 has a composite central land 32 made up from the adjacent ends 32a and 32b of the spool portions 13 and 14, The pilot spool. 12 has end lands 33 provided on respective spool portions 13 and 14, and intermediate lands 34 disposed, in the null position of the valve, to provide a zero lapped condition between the service ports 27 and 28 and the associated tank ports 23 and 24, The outer ends of the pilot spool valve portions 13 and 14 each have a reduced end portion 35 providing a step against which the associated washer 21 sits. The ends of the sleeve 29 provide stops 36 for the washers 21, thereby limiting the operational range of the pilot spool 12. The end chambers 19 are made up of a recess 37 in the valve body 11 and a recess 38 in a housing 41 of a solenoid 39 attached and sealed, in conventional manner, to the end of the spool valve body. Each solenoid 39 has a push pin 42 which is in contact with the associated reduced diameter portion 35 of the pilot spool 12.

In normal operation of the valve, both solenoids are energised to effect a push-pull action on the spool to move it in the required direction, so as in turn to move the spool 4 of the main stage or valve 2 to drive a load connected thereto in the required direction. In the null position of the pilot spool 12, the pressure ports 26a, 26b are zero lapped to the central lands 32a, 32b and the intermediate lands 34 are zero lapped to the tank ports 23 and 24, whereby the service ports 27 and 28 are, in the exact null position, blocked from the pressure port 26 and tank ports 23,24. Assuming the pilot spool 12 is moved to the left, as seen in FIG. 2 of the drawings, the central and portion 32b moves across pressure port 26b so that flow can take place therethrough to the service port 28 and thence to the right-hand chamber 6 of the main valve 2, whereby the pressure fluid in that chamber moves the main spool 4 to the left. At the same time, the intermediate land 34 on the pilot spool portion 13 opens the tank port 23 to the service port 27 and thus the left-hand chamber 5 of the main valve 2 to tank. If the pilot spool 12 is moved to the right, then the left-hand chamber 5 of the main valve 2 is pressurised and the right-hand chamber 6 vented to tank. During normal operation, the action of the solenoid push pins 42 serves to maintain the two portions 13 and 14 of the pilot spool 12 in contact with each other, thus overcoming the separating action of the spring 15. It will be seen that during operation of the valve, neither pressure port 26a or 26b sees the junction between the spool position 13 and 14 which is necessary otherwise pressure fluid acting on that junction would tend to separate the spool portions.

If the solenoids 39 are de-energised intentionally, or as a result of electrical supply failure, the solenoid push pins 42 no longer exert a closing force on the pilot spool portions 13 and 14 whereupon the spring 15 is effective in separating the spool portions, overcoming the closing action of the centring springs 18 and 19.

As the spool portions 13 and 14 move apart, the adjacent inner ends providing the central land portions 32a and 32b block, or overlap, the individual pressure ports 26a,26b, respectively, and each service port 27 and 28 is connected to tank since the intermediate lands 34 no longer block the tank ports 23 and 24. Thus, each end chamber 5 and 6 of the main stage valve 2 is quickly connected to tank, thus effecting a rapid centralisation of the main spool 4. As the pilot spool portions 13 and 14 move apart, hydraulic fluid fills the gap created therebetween, the fluid flowing through the through bores 16 and the radial bores 22, this fluid being at tank pressure. The end chambers 19 are also at tank pressure by virtue of the drillings 20 between those chambers and the tank loop or gallery 25, whereby the pilot valve spool 12 is pressure balanced. It will be understood that when the pilot valve resumes its normal operation and the two pilot spool portions 13 and 14 are moved back into contact with each other by the solenoid push pins 42, then hydraulic fluid is pumped to tank by this closing action, again, through the through and radial bores 16 and 22.

It will be seen that neither during the normal mode of operation nor the failsafe mode of operation of the valve, neither of the supply or pressure ports 26a,26b sees the ends of the spool portions 13,14 which are normally held in contact with each other by the spring 15.

It will be understood from the foregoing description of construction and operation of the illustrated embodiment that tile present invention provides a normal, zero lapped pilot valve of conventional construction as regards the provision of pressure, tank and service ports but by splitting the service port into two service ports, quick and reliable fail-safe operation takes place, thus removing the conflict between required zero lap for normal operation, and underlap for fail-safe operation. The present invention thus afford a significant advance in the art.

I claim:

1. An electrically operated, two-stage hydraulic spool valve comprising a main stage having a main spool centering springs acting on the main spool, a pilot stage having a pilot spool, and two solenoids acting on respective ends of the pilot spool to control the operating position of the latter, the solenoids being opposed by return springs also acting on respective ends of the pilot spool, the pilot stage comprising tank port means, supply port means, and two service ports, and the pilot spool comprising two portions, both said solenoids being continuously engaged during normal operation to push the two portions of said spool into contact with one another to obtain a specific lap condition, a spring interposed between the two portions and operable to urge the two portions apart in a direction axially of the pilot spool so that on de-energization of the solenoids, the portions of the pilot spool separate under the action of the spring to provide an interconnection between the pilot service ports and the tank port means, wherein the tank port means comprise two tank ports between which the two service ports are disposed, and in that the supply port means comprises two supply ports disposed between the service ports, said central port means, tank port means and said service ports being constructed and arranged with respect to the pilot spool and spaced apart by an amount such that, at least in normal operation of the pilot valve, neither supply port sees the ends of the two portions of the pilot spool which are maintained in contact by the operation of the solenoids.

2. A valve according to claim 1, wherein each spool portion has a spring chamber at the end adjacent the other portion, and there is a passageway from one chamber through the spool to a position on the spool which is always in communication with one tank port.

3. A valve according to claim 1, wherein the pilot valve spool has a composite central land formed from the adjacent ends of the two pilot valve spool portions, the two lands being zero lapped to the two supply ports and two intermediate lands being zero lapped to the two tank ports.

4. A valve according to claim 1, wherein neither supply port sees the ends of the two portions held in contact during any mode of operation of the valve.

5. A valve according to claim 1 wherein each spool portion has a spring chamber at the end adjacent the other portion and there is a passageway from both chambers through the spool to a position on the spool which is always in communication with both of the tank ports.

6. A valve according to any one of claims 1, 2, or 5, wherein the two supply ports are formed from a single supply port by the provision of a sleeve within which the pilot spool is slidably mounted, the sleeve being formed with at least two spaced-apart apertures disposed so as to be in communication with the supply port and so as to divide the latter into two.

* * * * *